United States Patent [19]

Becker

[11] Patent Number: 5,580,242

[45] Date of Patent: Dec. 3, 1996

[54] ROTARY KILN

[75] Inventor: Hans Becker, Tönisvorst, Germany

[73] Assignee: Babcock BSH Aktiengesellschaft, Krefeld, Germany

[21] Appl. No.: 352,373

[22] Filed: Dec. 8, 1994

[30] Foreign Application Priority Data

Dec. 11, 1993 [DE] Germany .............................. 9319041 U

[51] Int. Cl.[6] .................................................. F27B 7/00
[52] U.S. Cl. .......................... 432/103; 432/112; 432/113; 432/117; 34/136
[58] Field of Search .................................. 432/103, 102, 432/113, 117; 34/136

[56] References Cited

U.S. PATENT DOCUMENTS

| | | | |
|---|---|---|---|
| 4,957,433 | 9/1990 | Swisher, Jr. .............................. | 432/103 |
| 4,973,245 | 11/1990 | Monni ..................................... | 432/103 |
| 5,042,402 | 8/1991 | Freeman ................................. | 432/103 |
| 5,224,433 | 7/1993 | Benoit et al. ........................... | 432/103 |
| 5,302,118 | 4/1994 | Renegar et al. ........................ | 432/103 |

FOREIGN PATENT DOCUMENTS

| | | |
|---|---|---|
| 1629044 | 1/1971 | Germany . |
| 19079 | 2/1982 | Germany . |
| 3644806 | 5/1988 | Germany . |
| 3729032 | 3/1989 | Germany . |
| 918738 | 4/1982 | U.S.S.R. . |

*Primary Examiner*—Henry A. Bennett
*Assistant Examiner*—Siddharth Ohri
*Attorney, Agent, or Firm*—Herbert Dubno; Andrew Wilford

[57] ABSTRACT

A rotary kiln has a generally cylindrical housing centered on and extending along an axis inclined to the horizontal and having an upper upstream end and a lower downstream end and a drive that rotates the kiln about its axis. Particles to be heat-treated are fed into the housing at the upstream end and are extracted from the downstream end. A plurality of axially separate heat-exchange radiators fixed in the housing are connected axially in series and a fluent heat-exchange medium is flowed serially through the radiators from the downstream end of the housing to the upstream end of the housing.

6 Claims, 2 Drawing Sheets

ROTARY KILN

FIELD OF THE INVENTION

The present invention relates to a rotary kiln. More particularly this invention concerns such a kiln used for continuous heat-treatment of a particulate mass.

BACKGROUND OF THE INVENTION

A standard rotary kiln has a large-diameter cylindrical housing that is centered on an axis that is slightly inclined to the horizontal and that is rotated about this axis. Particles to be heat treated are fed into the upper upstream end of the housing and exit from the lower downstream end while being tumbled in the housing in contact with heat-exchange elements therein. Such a kiln can be used simply to dry sand or coal or can be used to calcine minerals, for instance in the production of cement.

German patents 19,079, 1,629,044, and 3,729,032 of F. Klee, J. Kaiser, and H. Luhmann, respectively, describe such a kiln provided internally with a succession of axially spaced radiators that are connected in parallel to each other to a hot-fluid feed line and a cool-fluid output line. Since the temperatures of the radiators are all substantially the same, the result is that the heat exchange is not very efficient in that the cold particles first hit the hot upstream radiator and as they are heated move downstream past radiators at the same temperature until they exit the machine. The heat exchange is greatest at the upstream radiator and least at the downstream one so that overall exchange efficiency is unsatisfactory in that the liquid leaving the downstream heat exchanger has not given up much of its heat.

German patent document 3,644,806 of H. Klutz describes a method for drying brown coal wherein condensed vapors of a fluidized bed dryer are fed through radiators of the fluidized bed and are condensed therein so that at least a part of the condensate can be used for preheating the brown coal to be dried. The condensate has a temperature of about 111° C. and should be cooled to about 40° C. The heat recovered in this manner is used to prewarm the moist brown coal from 15° C. to 65° C.

In this system to transmit the heat of the condensate to the brown coal it is necessary to use an apparatus of very large size with big heat-exchange surfaces. This is needed on the one hand because of the relatively small temperature differential and on the other hand because of the considerable throughput which in this case is 55t/h and which can be even more.

USSR patent document 918,738 of I. Pievskii describes another kiln having a succession of radiators connected in series. The heat-exchange medium moves through the radiators co-directionally with the particles through the exchanger, that is both the heat-exchange liquid and the particles move from the upstream end to the downstream end of the kiln. Thus as the particles get hotter the heat-exchange fluid gets cooler. As a result heat-exchange efficiency drops off because the temperature differential decreases.

OBJECTS OF THE INVENTION

It is therefore an object of the present invention to provide an improved rotary kiln.

Another object is the provision of such an improved rotary kiln which overcomes the above-given disadvantages, that is which has a very high heat-exchange efficiency.

SUMMARY OF THE INVENTION

A rotary kiln has according to the invention a generally cylindrical housing centered on and extending along an axis inclined to the horizontal and having an upper upstream end and a lower downstream end and a drive that rotates the kiln about its axis. Particles to be heat-treated are fed into the housing at the upstream end and are extracted from the downstream end. A plurality of axially separate heat-exchange radiators fixed in the housing are connected axially in series and a fluent heat-exchange medium is flowed serially through the radiators from the downstream end of the housing to the upstream end of the housing.

Thus in this system the heat-exchange medium and the particles run countercurrent to each other. In this manner the temperature differential between the particles and the immediately adjacent radiators will remain roughly the same; that is as the particles heat up they move downstream to an ever hotter radiator. It is therefore possible to transmit virtually all of the heat from the heat-exchange fluid to the particles.

Each radiator according to this invention comprises at least two parallel-connected tube assemblies and each tube assembly includes a plurality of parallel tubes having ends interconnected by U-fittings. The tubes are spaced apart sufficiently that the particles can pass between them and they are uniformly spaced over generally the entire cross-sectional area of the housing. Furthermore the tubes extend axially and each radiator is axially spaced from the adjacent radiator and is provided with an axially extending connector tube connecting itself to the adjacent radiator.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
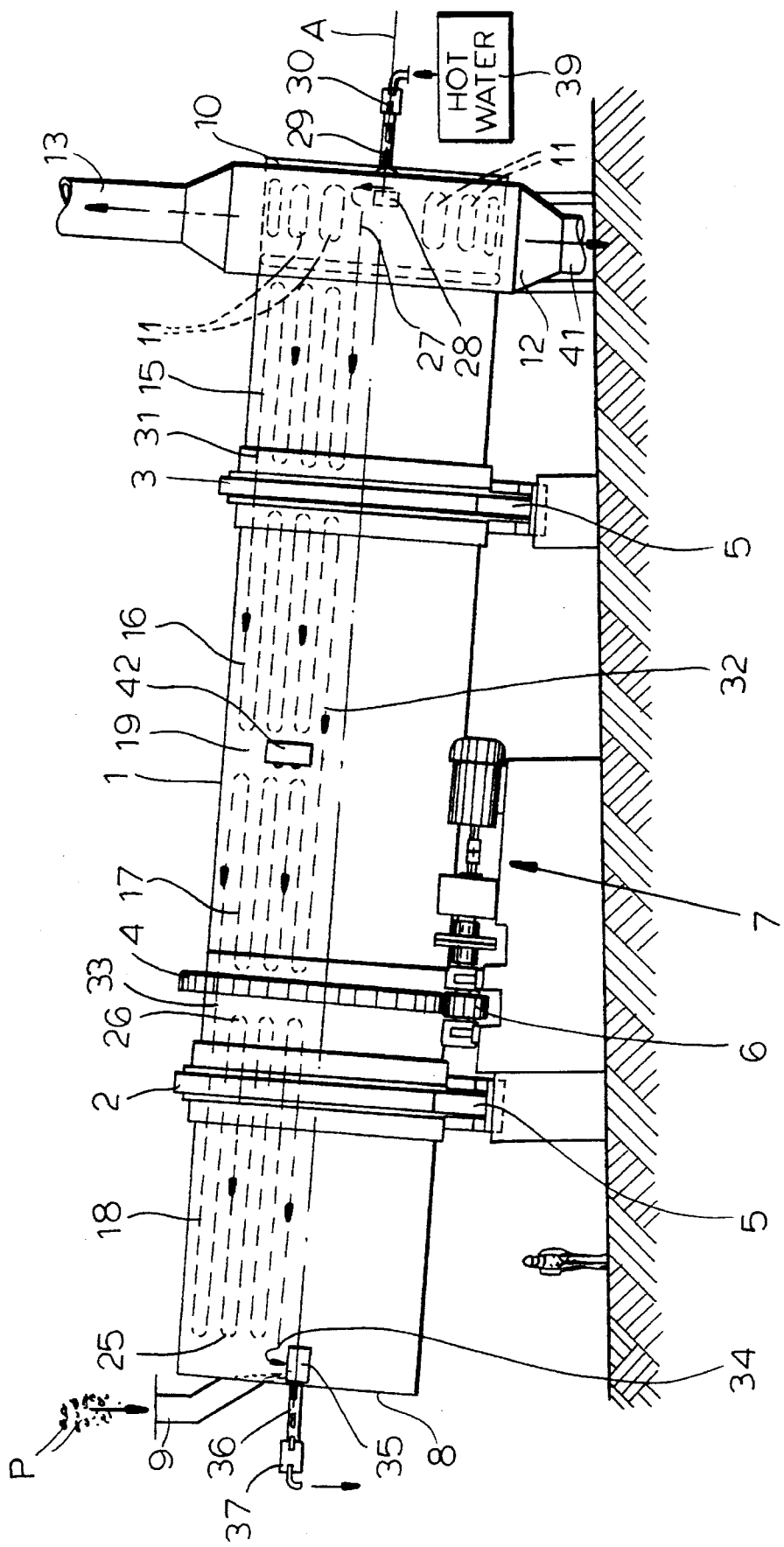
FIG. 1 is a partly diagrammatic small-scale side view of the kiln according to the invention.
Figure 2:
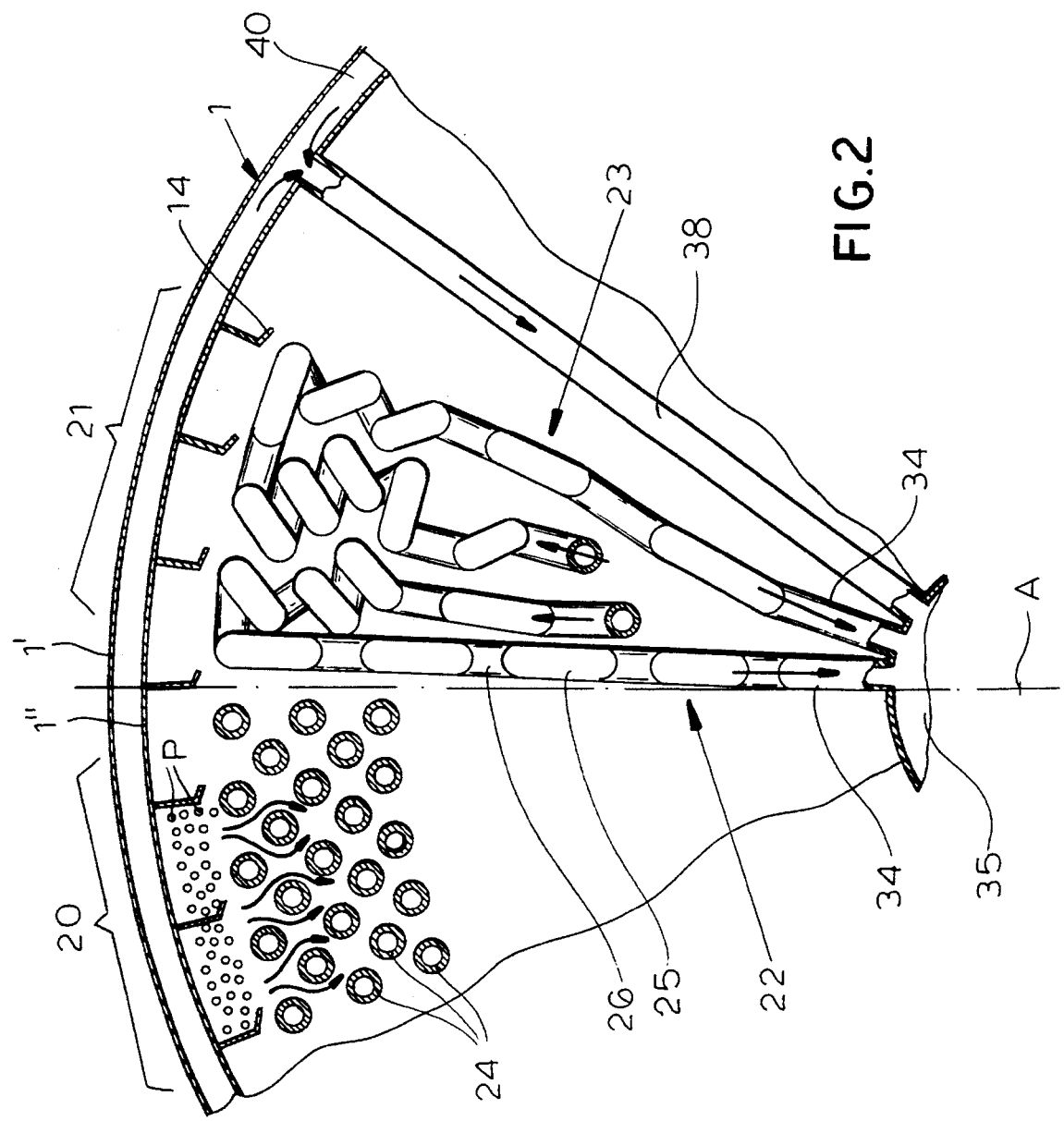
FIG. 2 is a cross section in two axially offset planes through the kiln.

As seen in FIG. 1 a rotary kiln according to this invention has a double-wall cylindrical housing 1 centered on an inclined axis A and measuring about 5 m in diameter and 25 m long. The housing 1 has two support rings 2 and 3 carried on rollers 5 and a ring gear 4 meshing with a pinion 6 driven by a motor/transmission assembly 7. The housing 1 has an upstream end wall 8 fitted with an input 9 for pouring particles P to be processed into the kiln and a downstream end wall 10 that closes the downstream end completely. Immediately upstream of its downstream end 10 the housing 1 is formed with an annular array of radially throughgoing outlet holes 11 that open into a stationary collector 12 from which the heat-treated particles P exit downward via an outlet 41 while the vapors exit upward via a chimney 13. Internally the housing 1 is fitted with shovel-shaped vanes 14 as shown in FIG. 2.

The housing 1 is provided with four axially spaced radiators 15, 16, 17, and 18 separated by spaces 19 that can be equipped with access ports 42. Each radiator 15–18 is subdivided into a plurality, here sixteen, of sectors 20, 21 (FIG. 2) each in turn fitted with two tube assemblies 22 and 23. Each tube assembly 22 and 23 is in turn formed by a multiplicity of short tubes 24 extending parallel to the axis A and interconnected at their ends by U-shaped fittings 25 and 26. The tubes 24 are laterally spaced by about one-half to twice their diameter and there are twenty to fifty such tubes 24 per square meter in the housing 1, seen in cross section.

The tube assemblies 22 and 23 of the furthest downstream radiator 15 are connected by input pipes 27 with a manifold 28 lying on the axis A and connected to a connector fitting 29 engaged in a rotary input fitting 30 to which hot water is fed from a supply 39. The tube assemblies 15, 16, 17, and 18 are interconnected axially by pipes or conduits 31, 32, and 33 and the furthest upstream radiator 18 is connected to a connector fitting 34 engaged in a rotary output fitting 35 from which the largely cooled off hot water is drained. In addition a space 40 between walls 1' and 1" of the housing 1 is connected via a conduit 38 to the drain fitting 34 at the upstream end and at the downstream end via a similar such conduit to the supply connector 28.

Thus the hot heat-exchange liquid will become progressively cooled at it moves upstream countercurrent to the particles P which become progressively heated as they move downstream. By the time the particles P leave at the outlet 41 they will be almost the same temperature as the incoming water from the source 39.

I claim:

1. A rotary kiln comprising:

a generally cylindrical housing centered on and extending along an axis inclined to the horizontal and having an upper upstream end and a lower downstream end;

means for rotating the kiln about its axis;

means for feeding particles to be heat-treated into the housing at the upstream end;

means for extracting the particles from the downstream end;

a plurality of axially separate and axially spaced heat-exchange radiators fixed in the housing;

respective axially extending connector tubes each connecting a respective one of the radiators axially in series with the adjacent radiator; and means for flowing a fluent heat-exchange medium serially through the radiators from the downstream end of the housing to the upstream end of the housing.

2. The rotary kiln defined in claim 1 wherein each radiator comprises at least two parallel-connected tube assemblies.

3. The rotary kiln defined in claim 2 wherein each tube assembly includes a plurality of parallel tubes having ends interconnected by U-fittings.

4. The rotary kiln defined in claim 3 wherein the tubes are spaced apart sufficiently that the particles can pass between them.

5. The rotary kiln defined in claim 3 wherein the tubes are uniformly spaced over generally the entire cross-sectional area of the housing.

6. The rotary kiln defined in claim 3 wherein the tubes extend axially.

\* \* \* \* \*